United States Patent [19]

Sudo et al.

[11] Patent Number: 4,835,027
[45] Date of Patent: May 30, 1989

[54] OPTICAL DISC

[75] Inventors: Ryoichi Sudo, Yokosuka; Hiroaki Miwa; Tetsuo Tajima, both of Fujisawa; Shinkichi Horigome, Tachikawa, all of Japan

[73] Assignees: Hitachi, Ltd.; Hitachi Maxell, Ltd., both of Tokyo, Japan

[21] Appl. No.: 30,687

[22] Filed: Mar. 27, 1987

[30] Foreign Application Priority Data

Mar. 28, 1986 [JP] Japan .................. 61-68389
Nov. 19, 1986 [JP] Japan ................ 61-274081

[51] Int. Cl.⁴ ..................... B32B 3/02; G03C 1/495; G11B 5/84
[52] U.S. Cl. ......................... 428/64; 428/65; 428/913; 430/271; 430/321; 430/285; 430/288; 430/945; 369/288; 346/76 L; 346/135.1
[58] Field of Search ............ 428/65, 64, 913; 430/271, 321, 285, 288, 945; 369/288; 346/76 L, 135.1

[56] References Cited

U.S. PATENT DOCUMENTS 4,355,093 10/1982 Hartmann et al. ............ 430/288
4,442,302 4/1984 Pohl ........................... 430/285
4,446,549 5/1984 Lippits et al. ................ 428/64
4,500,629 2/1985 Irving et al. ................. 430/285
4,619,890 10/1986 Molaire et al. ............... 430/346

FOREIGN PATENT DOCUMENTS 60-13335 1/1985 Japan .
60-99111 6/1985 Japan .
152515 10/1985 Japan .
1185575 8/1986 Japan ..................... 522/183

Primary Examiner—Ellis P. Robinson
Assistant Examiner—P. J. Ryan
Attorney, Agent, or Firm—Antonelli, Terry & Wands

[57] ABSTRACT

An optical disc wherein a transparent base plate is made from a special light-curable resin composition comprising at least one compound of the formula:

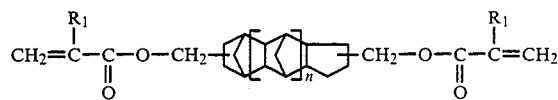

wherein $R_1$=H or methyl and n=0-5, and a photopolymerization initiator, is excellent in heat resistance, mechanical strength, moisture resistance, etc.

19 Claims, 3 Drawing Sheets

OPTICAL DISC

BACKGROUND OF THE INVENTION

This invention relates to an optically readable information disc (or simply optical disc) for storing, recording and reproducing voices, images, information, and the like, characterized in its base plate.

A base plate for optical discs used in digital audio discs, video discs, optical disc recording media, magneto-optical disc recording media comprises a transparent plate of about 1 mm thick having an information pattern of groove-like and hole-like depressions and protuberances on a surface thereof.

Such an optical disc base plate can be formed by the following three methods:

(1) In a mold installed with a metal-made stamper having an information pattern such as grooves and pits (or holes), a melt of polymer material such as polycarbonate, polymethyl methacrylate, or the like, is injected, cooled and molded to give a transparent plate having an information pattern [Nikkei Mechanical, page 34, Feb. 1, 1982; Nikkei Electronics, page 133, June 7, 1982].

(2) A thin liquid layer of light-curable resin is interposed between a metal-made stamper having an information pattern and a transparent supporting plate made from plastics or glass, and exposed to light from the transparent supporting plate side to cure the resin, followed by separation of the cured resin from the stamper while maintaining the adhesion between the transparent supporting plate and the cured resin to give a transparent plate having an information pattern [Japanese Patent Unexamined Publication Nos. 53-86756 and 55-152028].

(3) After pouring a light-curable resin into a space formed by placing a stamper having an information pattern and a light-transmissible flat plate in parallel, light is irradiated from the light-transmissible flat plate side to cure the resin, followed by removal of the stamper and the light-transmissible flat plate to give a transparent plate having an information pattern [Japanese Patent Unexamined Publication No. 55-160338].

But these methods have the following problems.

The method (1) is good in workability, but it is difficult to completely remove molecular orientation at the time of flowing and solidification of the polymer material. Thus, optical anisotropy is generated in the base plate, resulting in causing noises at the time of reading or writing information signals. The optical anisotropy in the base plate becomes particularly remarkable when a heat distortion temperature of the base plate is raised in order to obtain a heat resistant base plate, which results in making optically practical use impossible. Further, the base plate obtained by the method (1) has a tendency to make it difficult to precisely transfer the shape of information pattern from the stamper to the base plate.

The method (2) is good in transfer properties of the information pattern, but is complicated in working steps and has a tendency to make the production cost higher since the transparent supporting plate should be produced previously. Further since it is difficult to maintain sufficient adhesiveness between the transparent supporting plate and the light-curable resin, there is a tendency to make it difficult to maintain reliability for a long period of time under high temperatures and high humidity.

The method (3) is good in workability, but is difficult to select light-curable resins and molding conditions. Thus, it is difficult to produce the base plate having excellent mechanical strength, heat resistance and moisture resistance and small optical anisotropy.

SUMMARY OF THE INVENTION

It is an object of this invention to provide an optical disc overcoming the disadvantages of the prior art mentioned above, and having small optical anisotropy, a high heat distortion temperature, excellent stability under high temperatures and high humidity and low production cost.

This invention provides an optical disc comprising a transparent base plate having a relief structure corresponding to information signals to be carried, and a recording film layer formed thereon, characterized in that the transparent base plate is made from a light-curable resin composition comprising 100 parts by weight of at least one acrylic group- or methacrylic group-containing compound including a compound of the formula:

wherein $R_1$ is hydrogen or a methyl group; and n is zero or an integer of 1 to 5, in an amount of 30 to 100% by weight, and 0.5 to 10 parts by weight of a photopolymerization initiator.

DESCRIPTION OF THE PREFERRED EMBODIMENTS

Figure 1A:
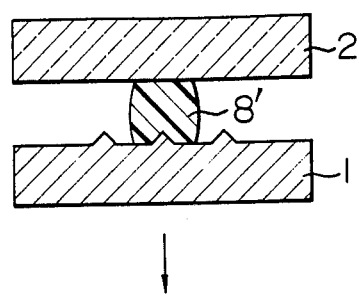
FIGS. 1 and 2 are schematic cross-sectional views showing processes for producing base plates for optical discs.
Figure 1B:
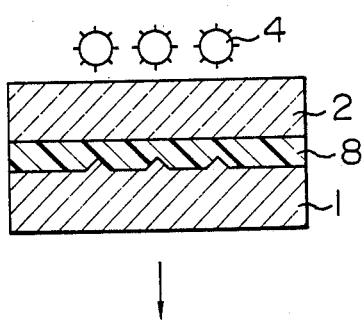
Figure 1C:
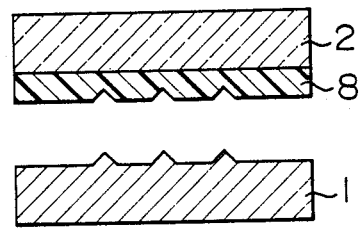
Figure 1D:
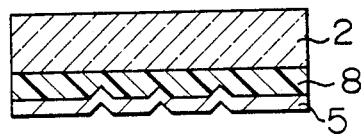
Figure 2A:
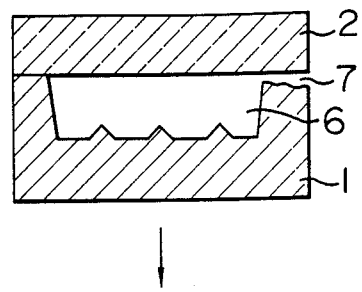
Figure 2B:
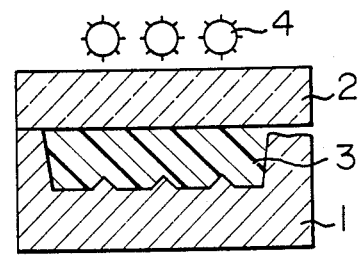
Figure 2C:
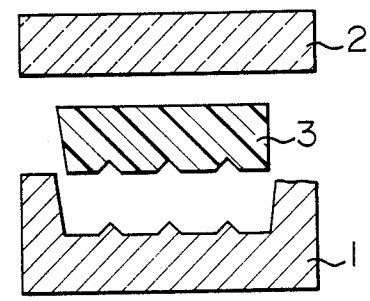
Figure 2D:
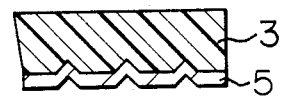

The term "base plate" used in this invention means both a substrate 3 shown in FIG. 2(d), and a transparent support 2 and an undercoating layer 8 shown in FIG. 1(d). Optical discs can be constructed in a conventional manner by using these base plates, that is, as one example, a transparent substrate 3 made from the special light-curable resin composition and having a relief structure corresponding to information signals to be carried and a metal-made recording film 5 formed on the relief structure as shown in FIG. 2(d), and as another example, a transparent support 2, a transparent undercoating layer 8 formed on the transparent support and made from the special light-curable resin composition and having a relief structure corresponding to information signals to be carried, and a metal-made recording film 5 formed on the relief structure as shown in FIG. 1(d).

The special light-curable resin composition used for forming the transparent substrate or the transparent undercoating layer comprises:

100 parts by weight of at least one acrylic group- or methacrylic group-containing compound including a compound of the formula:

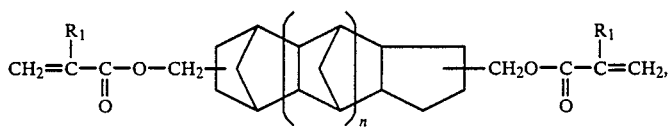

that is,

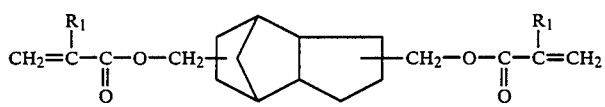

or

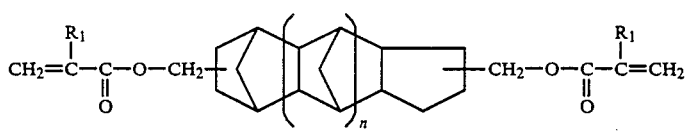

wherein $R_1$ is hydrogen or a methyl group; and n is zero or an integer of 1 to 5, in an amount of 30 to 100% by weight, and 0.5 to 10 parts by weight of a photopolymerization initiator.

The compound of the formula [I] is an important component of the light-curable resin composition and can satisfy a plurality of requirements such as to maintain the viscosity during working relatively low, to ensure the heat distortion temperature of a cured article, to improve moisture resistance, to reduce optical strain, and the like simultaneously. These requirements cannot be satisfied at the same time according to known materials.

These excellent properties of the compound of the formula [I] seem to be derived from the special chemical structure thereof. That is, complicated cyclo rings constituting the skeleton of the compound of the formula [I] weaken the intermolecular attraction and help to reduce the viscosity of the liquid compound. Thus, the workability of the resin composition using the compound of the formula [I] is improved. Further, a cured article of the light-curable resin composition has a higher heat distortion temperature due to rigidity of the cyclo rings of the compound of the formula [I], a lower moisture absorption property due to small polar groups, and little optical strain due to small refractive index anisotropy at the time of molecular orientation. Further, since the compound of the formula [I] has two acrylic groups or methacrylic groups in one molecule, the resin composition including it has excellent curing properties, large crosslinking density, and is effective for maintaining the high heat distortion temperature. Further, in the compound of the formula [I], the larger the value of n becomes, the more difficult it is to absorb water, resulting in imparting the resulting optical disc with a more preferable resistance to circumstances (or humidity). But when n is larger than 5, the viscosity of the compound of the formula [I] increases so high that there is a tendency to lower the workability. Therefore, from the viewpoint of the resistance to circumstances, the preferable value of n is 1 to 5.

The compound of the formula [I] can be produced, for example, as follows:

Polymerization of cyclopentadiene can be carried out by a process described, for example, in Von K. Alder, G. Stein: Justus Liebigs Aunalen der Chemic 485, 223–246 (1931) as follows:

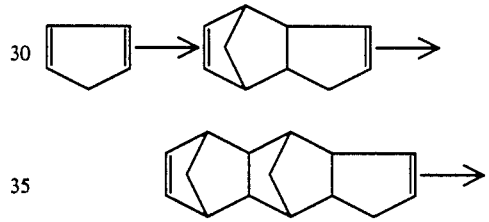

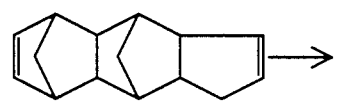

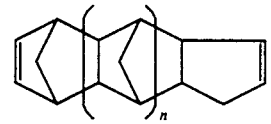

Modification of polycyclopentadiene with a diol can be carried out by a process described, for example, in Von B. Connils, R. Payer: Chemiker-Zeitung 98, 70–76 (1974), Report of Prefectural Industrial Research Institute of Hokkaido 74–82 (1968) as follows:

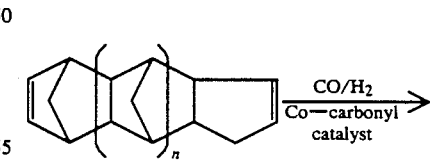

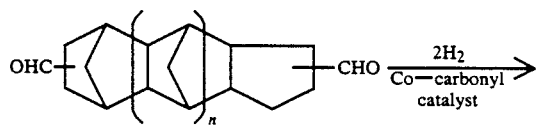

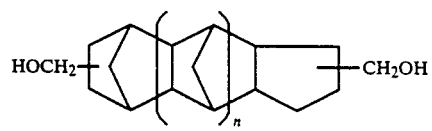

Modification of the resulting diol with an acrylate or methacrylate can be carried out by a process described, for example, in "Polymer Data Handbook" pp. 105, 121, (1986), published by Baifu-kan as follows:

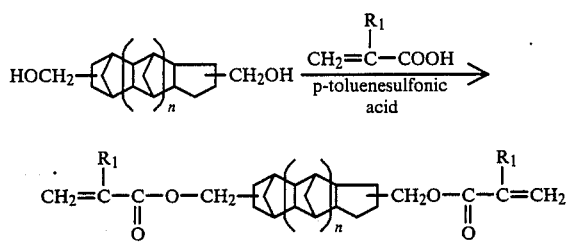

The compound of the formula [I] alone or as a mixture thereof can be used in an amount of 30 to 100% by weight as the acrylic group- or methacrylic group-containing compound. It is possible to use one or more other acrylic group- or methacrylic group-containing compounds, in order to adjust the viscosity and the degree of curing so long as the properties of the compound of the formula [I] are not damaged, in amounts up to 70% by weight. Further, by admixing one or more compounds having special acrylic or methacrylic groups as shown in the working examples mentioned below, the optical properties and mechanical properties of the compound of the formula [I] can be improved remarkably. Such compounds include (i) monofunctional monomers and (ii) polyfunctional monomers, these monomers being compatible with the compound of the formula [I] and able to bring about copolymerization by radical polymerization.

Examples of the monofunctional and polyfunctional monomers are as follows:

(i) Monofunctional Monomers:

A compound of the formula:

$$CH_2=C-C-O-R_5 \quad [II]$$
$$\phantom{CH_2=}\,R_1\,\,O$$

wherein $R_1$ is hydrogen or a methyl group; and $R_5$ is a hydrocarbon group having 6 to 16 carbon atoms, e.g.,

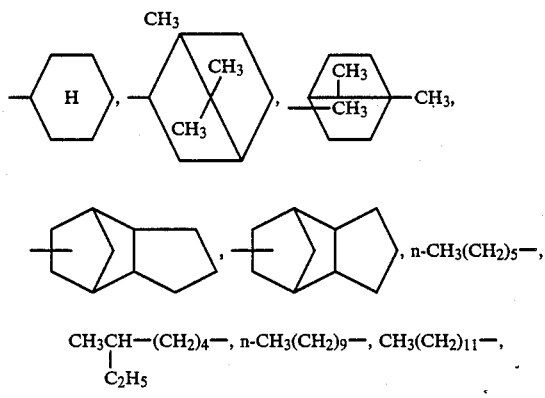

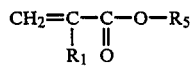, n-CH$_3$(CH$_2$)$_5$—,

CH$_3$CH—(CH$_2$)$_4$—, n-CH$_3$(CH$_2$)$_9$—, CH$_3$(CH$_2$)$_{11}$—,
|
C$_2$H$_5$

CH$_3$(CH$_2$)$_{12}$—, etc.

Among these groups,

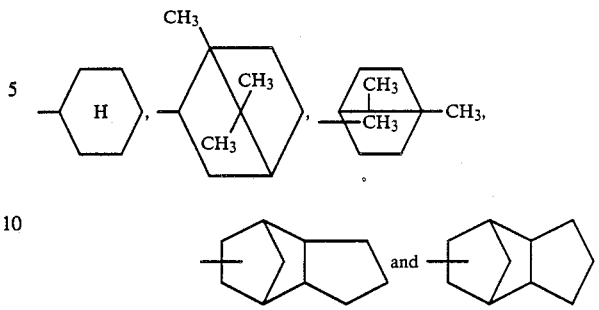

are more preferable.

Examples of the compound of the formula [II] are cyclohexyl acrylate, cyclohexy methacrylate, bornyl acrylate, bornyl methacrylate, isobornyl acrylate, isobornyl methacrylate, dicyclopentenyl acrylate, dicyclopentenyl methacrylate, tricyclodecanyl acrylate, tricyclodecanyl methacrylate, n-hexyl acrylate, n-hexyl methacrylate, 2-ethylhexyl acrylate, 2-ethylhexyl methacrylate, n-decyl acrylate, n-decyl methacrylate, lauryl acrylate, lauryl methacrylate, tridecyl acrylate, tridecyl methacrylate, etc. These compounds can be used alone or as a mixture thereof.

(ii) Polyfunctional Monomers:

Ethylene glycol diacrylate, ethylene glycol dimethacrylate, propylene glycol diacrylate, propylene glycol dimethacrylate, neopentyl glycol diacrylate, neopentyl glycol dimethacrylate, 1,6-hexanediol diacrylate, 1,6-hexanediol dimethacrylate 1,10-decanediol diacrylate, 1,10-decanediol dimethacrylate; epoxy acrylates and methacrylates such as bisphenol A diglycidyl ether acrylate, bisphenol A diglycidyl ether methacrylate, hydrogenated bisphenol A diglycidyl ether acrylate, hydrogenated bisphenol A diglycidyl ether methacrylate, etc.; ether acrylates and methacrylates such as bisphenol A ethylene glycol adduct diacrylate, bisphenol A ethylene glycol adduct dimethacrylate, hydrogenated bisphenol A ethylene glycol adduct diacrylate, hydrogenated bisphenol A ethylene glycol adduct dimethacrylate, etc.; urethane acrylates and methacrylates of the formula:

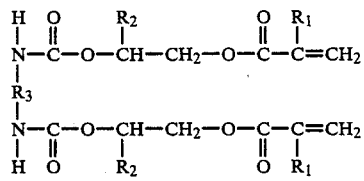

wherein $R_1$ is hydrogen or a methyl group; $R_2$ is hydrogen, an alkyl group having 1 to 5 carbon atoms or

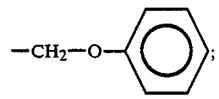

and $R_3$ is a hydrocarbon group having 6 to 16 carbon atoms, such as a reaction product of 1 mole of isophorone diisocyanate and 2 moles of 2-hydroxyethyl acrylate or 2-hydroxyethyl methacrylate, a reaction product of 1 mole of methylenebis(4-cyclohexyl isocyanate) and 2 moles of 2-hydroxypropyl acrylate or 2-hydroxypropyl methacrylate, etc.; trimethylolethane triacrylate, trimethylolethane trimethacrylate, trimethylolpropane triacrylate, trimethylolpropane trimethacrylate, pentaerythritol tetraacrylate, pentaerythritol tetramethacrylate, dipentaerythritol hexaacrylate, dipentaerythritol hexamethacrylate; and a compound of the formula:

$$\begin{array}{c} H\ O\ \ \ \ R_2\ \ \ \ \ O\ R_1 \\ | \ \| \ \ \ \ | \ \ \ \ \ \ \| \ | \\ N-C-O-CH-CH_2-O-C-C=CH_2 \\ | \\ R_3 \\ | \\ H-N \\ | \\ O=O \\ | \\ R_4 \\ | \\ O \\ | \\ O=C \\ | \\ H-N \\ | \\ R_3 \\ | \ \| \ \ \ \ | \ \ \ \ \ \ \| \ | \\ N-C-O-CH-CH_2-O-C-C=CH_2 \\ | \ \| \ \ \ \ | \ \ \ \ \ \ \| \ | \\ H\ O\ \ \ \ R_2\ \ \ \ \ O\ R_1 \end{array} \quad [IV]$$

wherein $R_1$ is hydrogen or a methyl group; $R_2$ is an alkyl group having 1 to 5 carbon atoms or —CH$_2$—O—⟨phenyl⟩;

$R_3$ is a hydrocarbon group having 6 to 16 carbon atoms, e.g. —⟨phenyl-CH$_3$⟩—, —⟨phenyl⟩—CH$_2$—⟨phenyl⟩—, —⟨phenyl⟩—C(CH$_3$)$_2$—⟨phenyl⟩—, —⟨cyclohexyl-H⟩—CH$_3$, —⟨cyclohexyl-H⟩—CH$_2$—⟨cyclohexyl-H⟩—, —⟨cyclohexyl-H⟩—C(CH$_3$)$_2$—⟨cyclohexyl-H⟩—, (CH$_3$)$_2$-cyclohexyl-CH$_3$-CH$_2$— , $\text{-}(CH_2)_{6-16}\text{-}$, etc., more preferably —⟨phenyl⟩—CH$_2$—⟨phenyl⟩—, —⟨cyclohexyl-H⟩—CH$_2$—⟨cyclohexyl-H⟩— or (CH$_3$)$_2$-cyclohexyl-(CH$_3$)(CH$_3$)-CH$_2$—;

and $R_4$ is a hydrocarbon group having 2 to 100 carbon atoms, preferably 6 to 16 carbon atoms, e.g.

$\text{-}(CH_2)_2\text{-}$, —CH$_2$—CH(CH$_3$)—, $\text{-}(CH_2)_4\text{-}$, $\text{-}(CH_2)_5\text{-}$, $\text{-}(CH_2)_6\text{-}$, $\text{-}(CH_2)_{10}\text{-}$, $\text{-}(CH_2)_{12}\text{-}$, $\text{-}(CH_2)_{14}\text{-}$, $\text{-}(CH_2)_{20}\text{-}$, —CH$_2$—⟨cyclohexyl-H⟩—CH$_2$—, or $\text{-}(CH_2\text{-}CH)_{10-25}\text{-}$
$\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |$
$\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ CH_2$
$\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |$
$\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ CH_3$ These polyfunctional monomers can be used alone or as a mixture thereof.

The compound of the formula [IV] can be synthesized, for example, by reacting 1 mole of a diol with 2 moles of a diisocyanate, followed by a reaction of residual isocyanate group with 2 moles of monohydroxylated acrylate or methacrylate. These compounds can be reacted as they are. If necessary, the reaction can be carried out in an organic solvent such as toluene, xylene, or the like which is inert to the isocyanate. It is possible to carry out the reaction by using a tin compound catalyst such as di-n-butyl tin dilaurate, or the like as a reaction accelerator. If necessary, the reaction can be carried out at 50° to 70° C.

As the diol, there can be used ethylene glycol, propylene glycol, 1,4-butanediol, 1,5-pentanediol, 1,6-hexanediol, 1,10-decanediol, 1,12-dodecanediol, 1,14-tetradecanediol, 1,4-cyclohexyldimethanol, hydrogenated butanediol, etc.

As the diisocyanate, there can be used 2,4-tolylene diisocyanate, 4,4'-diphenylmethane diisocyanate, 2,2'-diphenylpropane-4,4'-diisocyanate, 1-methylcyclohexane-2,4-diisocyanate, methylenebis(4-cyclohexyl isocyanate), 2,2'-propylenebis(4-cyclohexyl isocyanate), isophorone diisocyanate 1,6-hexamethylene diisocyanate, 1,16-hexadecamethylene diisocyanate, etc.

As the monohydroxylated acrylate or methacrylate, there can be used 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxypentyl acrylate, 2-hydroxypentyl methacrylate, 2-hydroxy-3-phenoxypropyl acrylate, 2-hydroxy-3-phenoxypropyl methacrylate, etc.

Useful examples of the compounds of the formula [IV] are as follows:

a reaction product obtained by reacting 1 mole of 1,6-hexanediol and 2 moles of isophorone diisocyanate, followed by addition of 2 moles of 2-hydroxyethyl acrylate or methacrylate, a reaction product obtained by reacting 1 mole of 1,10-decanediol and 2 moles of isophorone diisocyanate, followed by addition of 2 moles of 2-hydroxyethyl acrylate or methacrylate, a reaction product obtained by reacting 1 mole of 1,12-dodecanediol and 2 moles of isophorone diisocyanate, followed by addition of 2 moles of 2-hydroxybutyl acrylate or methacrylate, a reaction product obtained by reacting 1 mole of 1,14-tetradecanediol and 2 moles of isophorone diisocyanate, followed by addition of 2 moles of 2-hydroxyethyl acrylate or methacrylate, a reaction product obtained by reacting 1 mole of 1,4-cyclohexyldimethanol and 2 moles of isophorone diisocyanate followed by addition of 2 moles of 2-hydroxyethyl acrylate or methacrylate, a reaction product obtained by reacting 1 mole of 1,6-hexanediol and 2 moles of methylenebis(4-cyclohexyl isocyanate), followed by addition of 2 moles of 2-hydroxypropyl acrylate or methacrylate, a reaction product obtained by reacting 1 mole of 1,4-cyclohexyldimethanol and 2 moles of 1-methylcyclohexane-2,4-diisocyanate, followed by addition of 2 moles of 2-hydroxybutyl acrylate or methacrylate, a reaction product obtained by reacting 1 mole of 1,10-decanediol and 2 moles of 2,2'-propylenebis(4-cyclohexyl isocyanate), followed by addition of 2 moles of 2-hydroxy-3-phenoxypropyl acrylate or methacrylate, a reaction product obtained by reacting 1 mole of 1,10-decanediol and 2 moles of isophorone diisocyanate, followed by addition of 2 moles of 2-hydroxytubyl acrylate or methacrylate, etc.

As the photopolymerization initiator, there can be used benzils such as benzil, etc.; benzoins such as benzoin, benzoin methyl ethyl, benzoin ethyl ether, benzoin isopropyl ether, benzoin isobutyl ether, α-methylbenzoin, etc.; benzophenones such as benzophenone, 4-methoxybenzophenone, 1-hydroxycyclohexyl benzophenone, etc.; acetophenones such as acetophenone, 2,2-diethoxyacetophenone, α,α,α-tribromoacetophenone, etc.; thioxanthones such as 2-chlorothioxanthone, 2-methylthioxanthone, etc.; anthraquinones such as 2-ethylanthraquinone, 2-methylanthraquinone, etc.; benzyl methyl ketal, 1-hydroxycyclohexyl phenyl ketone, 2-hydroxy-2-methyl-1-phenylpropane-1-one, 1-(4-isopropylphenyl)-2-hydroxy-2-methylpropane-1-one, etc. These photopolymerization initiators can be used alone or as a mixture thereof.

Figure 4:
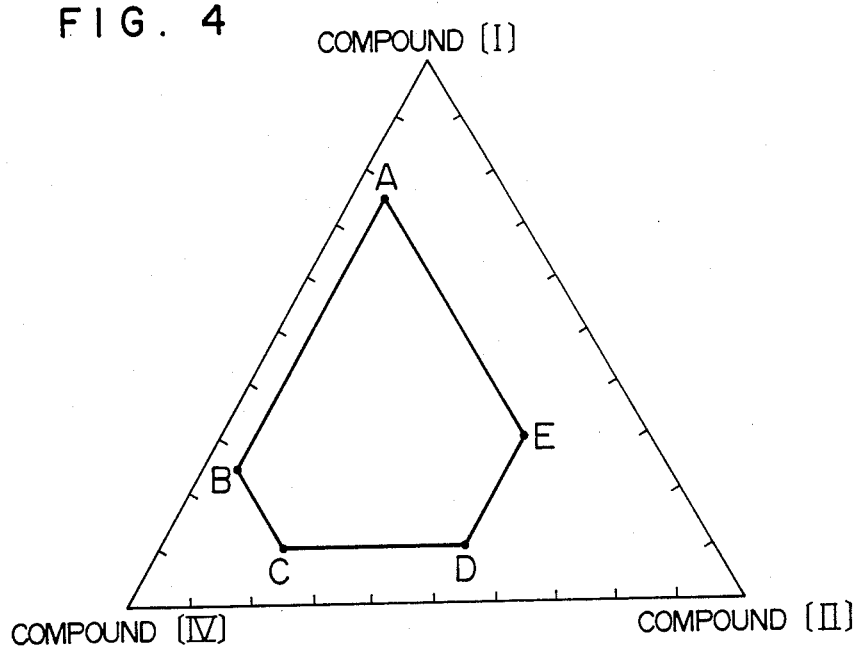
FIG. 4 is a triangular diagram showing compounding range of compounds [I], [II] and [IV] in the light-curable resin composition used in this invention.

Among the light-curable resin compositions, preferable ones comprise a compound of the formula [I], a compound of the formula [II], a compound of the formula [IV], and a photopolymerization initiator, the amounts of the compounds [I], [II] and [IV] being in the range enclosed by the line A-B-C-D-E-A in the triangular diagram shown by FIG. 4 and the amount of the photopolymerization initiator being 0.5 to 10 parts by weight, preferably 0.5 to 5 parts by weight, more preferably 0.7 to 3 parts by weight based on 100 parts by weight of the total of the compounds [I], [II] and [IV], and individual points A, B, C, D and E in FIG. 4 having the following values in percents by weight.

| Point | Compound [I] wt % | Compound [IV] wt % | Compound [II] wt % |
|---|---|---|---|
| A | 75 | 20 | 5 |
| B | 25 | 70 | 5 |
| C | 10 | 70 | 20 |
| D | 10 | 40 | 50 |
| E | 30 | 20 | 50 |

As mentioned above, the compound of the formula [I] is used in an amount of 10 to 75% by weight based on the total amounts of the resin components. When the amount is less than 10% by weight, the effects of the compound of the formula [I] become insufficient, whereas when the amount is more than 75% by weight, the cured product has lower in mechanical strength and increased optical strain.

The compound of the formula [IV] is effective for ensuring necessary mechanical strength of the cured product. The compound of the formula [IV] is used in an amount of 20 to 70% by weight based on the total amounts of the resin components. When the amount is less than 20% by weight, the effect mentioned above becomes insufficient, whereas when the amount is more than 70% by weight, the viscosity of the resin before curing becomes higher to make the workability worse and at the same time heat resistance of the cured article is lowered.

The compound of the formula [II] is effective for lowering the viscosity so as to make the working easy and to lower optical strain and absorption properties of the cured article. The compound of the formula [II] is used in an amount of 5 to 50% by weight based on the total amounts of the resin components. When the amount is less than 5% by weight, the effects mentioned above become insufficient, whereas when the amount is more than 50% by weight, there is a tendency to lower the mechanical strength of the cured article.

The photopolymerization initiator is effective for producing radicals by irradiation of light in the light-curable resin composition and making the acryl group and the methacryl group in the light-curable resin composition bring about radical polymerization. When the amount of the photopolymerization initiator is less than 0.5 part by weight based on 100 parts by weight of the total of the compounds [I], [II] and [IV], the curing by light becomes insufficient. On the other hand, when the amount is more than 10 parts by weight, there is a tendency to lower the mechanical strength of the cured article.

The light-curable resin composition may further contain a silane coupling agent such as γ-acryloxypropyltrimethoxysilane, γ-methacryloxypropyltrimethoxysilane, vinyltrimethoxysilane, vinyltriethoxysilane, etc., alone or as a mixture thereof, in an amount of preferably upto 6 parts by weight based on 100 parts by weight of the light-curable resin composition in order to further stabilize the adhesive properties of the light-curable resin composition at the time of absorbing moisture.

Using the light-curable resin composition, plastic information-recording media such as optical discs can be produced according to conventional processes.

For example, the light-curable resin composition 8' is inserted into a space formed between a stamper 1 of, e.g., nickel having grooves and pits thereon and a transparent support 2 made of, e.g., glass plate, plastic plate, etc., as shown in FIG. 1(a) and pressed at a pressure of 2 to 20 g/cm², preferably 5 to 15 g/cm² and exposed to ultraviolet irradiation at 50 to 400 mW/cm², preferably 100 to 250 mW/cm², using a high-pressure mercury lamp 4, xenone lamp, or the like to cure the resin composition (FIG. 1(b)).

After curing the resin composition for the undercoating layer 8, the stamper 1 is removed as shown in FIG. 1(c). Then, a recording film 5 made of a metallic material such as Al, Bi, In, Te, Te alloys, As, Pb, Sn, TbFe alloys, TbCo alloys, or the like with almost uniform thickness is formed on the surface of the undercoating layer 8 to give an optical disc base plate integrally formed of the recording film 5, the undercoating layer 8 and the transparent support 1 as shown in FIG. 1(d).

Finally, two optical disc base plates are placed in parallel so as to face the primer layer resin sides to each other and bonded via spacers with a predetermined space to give an air sandwich type optical disc.

A base plate for optical discs comprising a transparent substrate 3 and a recording film 5 can be produced by a process shown by FIGS. 2(a) to 2(d), wherein numeral 1 denotes a stamper, numeral 2 a transparent support, numeral 4 a high-pressure mercury lamp, numeral 6 a space and numeral 7 an inlet for pouring a light-curable resin composition.

Using these base plates as shown in FIG. 1(d) and FIG. 2(d), it is possible to produce optical disc by a so-called cast method by placing a pair of the base plates facing the recording film sides to each other and bonding them via an adhesive.

The thus produced optical discs according to this invention are stable and hardly cause softening and expansion of the base plates even if allowed to stand under a wide range of temperatures from as low as −40° C. or lower to as high as 120° C. or higher, or under high temperatures and high humidity (60° C. or higher and 95% RH or higher), so that no extreme stress is given to the attached film, resulting in causing no cracks on and no peeling of the attached film.

This invention is illustrated by way of the following Examples, in which all percents and parts are by weight unless otherwise specified.

EXAMPLES 1 TO 13, COMPARATIVE EXAMPLES 1 TO 5

Light-curable resin compositions were prepared by uniformly mixing compounds of the formulae (A) and (B) belonging to the compound of the formula [I], generally used acrylates and methacrylates of the formulae (U) to (Z) with a photopolymerization initiator and a silane coupling agent as listed in Table 1.

The compounds of the formulae (A) and (B) were liquid with relatively high viscosities at room temperature.

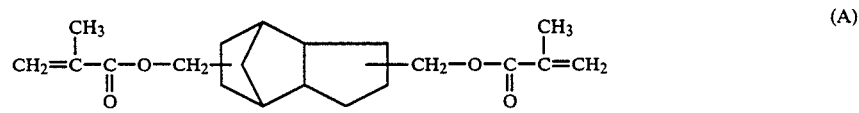

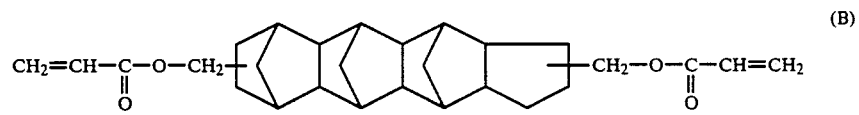

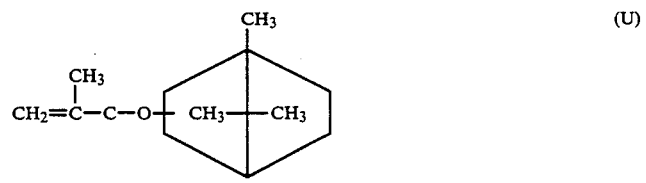

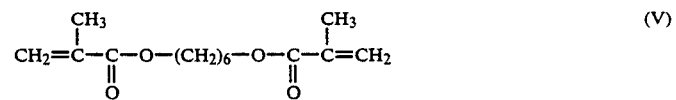

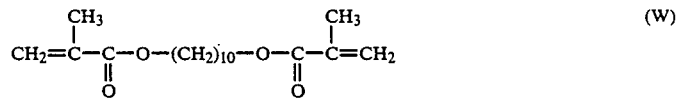

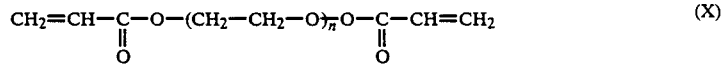

(molecular weight, about 400)

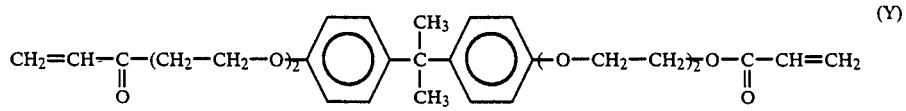

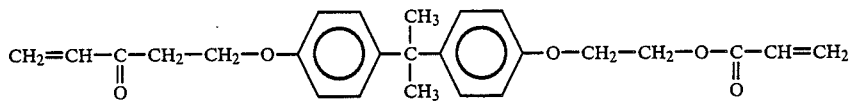

The compounds of the formulae (U) to (Z) were liquid at room temperature.

As the silane coupling agent, γ-methacryloxypropyltrimethoxysilane was used.

As the photopolymerization initiator, 2-hydroxy-2-methyl-1-phenylpropane-1-one was used.

A stamper 1 as shown in FIG. 1(a) made of nickel having an outer diameter of 300 mm with grooves (depth 0.09 μm, width 0.40 μm) and pits (depth 0.16 μm, width 0.60 μm) was prepared.

A light-curable resin composition 8' was interposed between a transparent support 2 (thickness 1.2 mm) made of glass, having an outer diameter of 300 mm and treated with a silane coupling agent (γ-methacryloxypropyltrimethoxysilane) by baking at 110° C. for 30 minutes and the stamper 1. The transparent support 2 was pressed to the stamper 1 so as to make the thickness of the light-curable resin composition layer about 80 μm as shown in FIG. 1(b). Then, the light-curable resin composition 8' was cured by irradiating energy beams having a wavelength of 320 to 400 nm and light intensity of 150 mw/cm³ from a high-pressure mercury lamp 4 for 30 seconds from the transparent support 2 side.

Then, the stamper 1 was separated from the cured product of light-curable resin composition (an undercoating layer 8) as shown in FIG. 1(c) to give a transparent base plate having an information pattern thereon.

Subsequently, Te-Sn-Pb alloy recording film 5 with 30 nm thick was formed on the information pattern surface by vacuum deposition as shown in FIG. 1(d). Finally, optical discs were constructed according to a conventional method.

The thus constructed optical discs were subjected to the following tests.

(1) Heat Resistance

An optical disc was allowed to stand at 100° C. for 4 hours and evaluated as follows:

TABLE 1

| | | Example No. | | | | | | | | | | | | | Comparative Example No. (Parts) | | | | | |
|---|---|---|---|---|---|---|---|---|---|---|---|---|---|---|---|---|---|---|---|---|
| Composition | | 1 | 2 | 3 | 4 | 5 | 6 | 7 | 8 | 9 | 10 | 11 | 12 | 13 | 1 | 2 | 3 | 4 | 5 |
| Compound [I] | A | 98 | — | 78 | 48 | 48 | 30 | 48 | 48 | — | — | — | 24 | 24 | — | — | — | — | — |
| | B | — | 98 | — | — | — | — | — | — | 48 | 48 | 48 | 24 | 24 | — | — | — | — | — |
| Generally used acrylates or methacrylates | U | — | — | 20 | — | — | — | 25 | 25 | 20 | — | — | 25 | 25 | — | — | — | — | — |
| | V | — | — | — | 50 | — | — | 25 | — | — | 50 | — | 25 | — | — | — | 50 | 50 | — |
| | W | — | — | — | — | 50 | 68 | — | 25 | — | — | 50 | — | 25 | — | — | — | — | — |
| | X | — | — | — | — | — | — | — | — | — | — | — | — | — | 98 | — | 48 | — | — |
| | Y | — | — | — | — | — | — | — | — | — | — | — | — | — | — | 98 | — | 48 | — |
| | Z | — | — | — | — | — | — | — | — | — | — | — | — | — | — | — | — | — | 98 |
| Silane coupling agent | | — | — | — | — | — | — | — | — | — | — | — | 1 | 1 | — | — | — | — | — |
| Photopolymerization initiator | | 2 | 2 | 2 | 2 | 2 | 2 | 2 | 2 | 2 | 2 | 2 | 2 | 2 | 2 | 2 | 2 | 2 | 2 | o: Relief grooves on which a recording film had been vapor deposited were excellent in thermal stability without changing the depth and shape of grooves and without causing cracks on or peeling of the recording film.

x: The above-mentioned changes were brought about and an optical disc was unbearable for practical use.

(2) Moisture Resistance

An optical disc was allowed to stand at 60° C. and 95% RH for 100 hours and evaluated as follows:

o: No change was caused in the relief of grooves on which a recording film had been vapor deposited, no cracks were generated in the recording film, no peeling of an undercoating layer took place, no oxidation of the recording film or no change in light transmittance were brought about by corrosive substances released from a cured resin by the moisture absorption of the light-curable resin, and the optical disc was bearable for practical use.

x: The above-mentioned changes were brought about and an optical disc was unbearable for practical use.

TABLE 2

| | Example No. | | | | | | | | | | | | | Comparative Example No. | | | | |
|---|---|---|---|---|---|---|---|---|---|---|---|---|---|---|---|---|---|---|
| Properties | 1 | 2 | 3 | 4 | 5 | 6 | 7 | 8 | 9 | 10 | 11 | 12 | 13 | 1 | 2 | 3 | 4 | 5 |
| Heat resistance | o | o | o | o | o | o | o | o | o | o | o | o | o | x | x | x | x | x |
| Moisture resistance | o | o | o | o | o | o | o | o | o | o | o | o | o | x | x | x | x | x |

As is clear from Table 2, the optical discs of Examples 1 to 13 are excellent in the heat resistance and the moisture resistance and bearable for practical use. On the other hand, the optical discs of Comparative Examples 1 to 5 wherein generally used acrylates or methacrylates are used cause the deformation of information patterns, cracks on the recording films and peeling of the recording films and are unbearable for practical use.

Further, the optical discs of Examples 1 to 13 were operated normally, when writing and reading properties by using a semiconductor laser light of 830 nm were evaluated.

EXAMPLE 14

A stamper 1 as shown in FIG. 2(a) made of nickel having an effective diameter of 120 mm with grooves (depth 0.09 μm, width 0.40 μm) and pits (depth 0.16 μm, width 0.60 μm) was prepared.

A transparent support 2 (thickness 10 mm) of glass circular plate having an outer diameter of 200 mm and baked with a dimethylsilicone mold release agent was placed opposite to the stamper to form a space 6 with 1.3 mm. From an inlet 7, the same light-curable resin compositions 8' used in Examples 1 to 13 and Comparative Examples 1 to 5 were poured under vacuum as shown in FIG. 2(b), respectively.

Then, the light-curable resin composition was cured by irradiating energy beams having a wavelength of 320 to 400 nm and light intensity of 30 mw/cm$^3$ from a high-pressure mercury lamp 4 for 90 seconds from the transparent support 2 side. The cured article 3 (substrate) obtained from the light-curable resin composition was separated from the stamper 1 and the transparent support 2 as shown in FIG. 2(c) to give the transparent substrate 3 having a thickness of about 1.2 mm together with grooves and pits.

Optical anisotropy of the transparent substrate was measured by using a light with a wavelength of 830 nm and evaluated as retardation [R=d($n_1-n_2$), wherein d is the thickness of the transparent support; and $n_1$ and $n_2$ are refractive indexes at main stress directions 1 and 2]. The retardation of 10 nm or less was evaluated as good.

The results are shown in Table 3.

TABLE 3

| Resin Composition | Retardation (nm) |
|---|---|
| Example | |
| 1 | 10 |
| 2 | 10 |
| 3 | 5 |
| 4 | 10 |
| 5 | 10 |
| 6 | 10 |
| 7 | 5 |
| 8 | 5 |
| 9 | 5 |
| 10 | 10 |
| 11 | 10 |
| 12 | 5 |
| 13 | 5 |
| Comparative Example | |
| 1 | 10 |
| 2 | 20 |
| 3 | 20 |
| 4 | 20 |
| 5 | 20 |

As is clear from Table 3, the retardation of the substrates obtained from the resin compositions of Examples 1 to 13 was satisfactory but almost substrates obtained from Comparative Examples 1 to 5 were unsatisfactory.

On the other hand, each multi-layer recording film 5 [SiO+Te-Fe alloy+SiO layers with thicknesses of 1000 Å+500 Å+1000 Å] was vapor deposited on each transparent substrate having grooves and pits thereon, followed by the construction to give an optical disc.

The heat resistance and moisture resistance of the resulting optical discs were evaluated in the same manner as described in Examples 1 to 13. Those obtained from the resin compositions of Examples 1 to 13 were excellent both in the heat resistance and moisture resistance as in Examples 1 to 13, but those obtained from the resin compositions of Comparative Examples 1 to 5 were poor in heat resistance and moisture resistance as in Comparative Examples 1 to 5.

Further, the optical discs obtained by using the resin compositions of Examples 1 to 13 were operated normally, when writing, reading and erasing properties by using a semiconductor laser light of 830 nm were evaluated.

EXAMPLE 15

Resin plates of 1 mm thick, 5 mm wide and 50 mm long were produced by using the resin compositions of Examples 1 and 5, and Comparative Examples 1, 2 and 5 and curing by using a high-pressure mercury lamp (light intensity of 150 mw/cm$^3$ at a wavelength of 320-400 nm).

One end of each resin plate at the lengthwise direction was fixed and maintained horizontally, while the other end was loaded with a load of 10 g. Such a sample was placed in a constant temperature bath and the temperature was raised with an interval of 10° C. while maintaining at each temperature for 1 hour.

Figure 3:
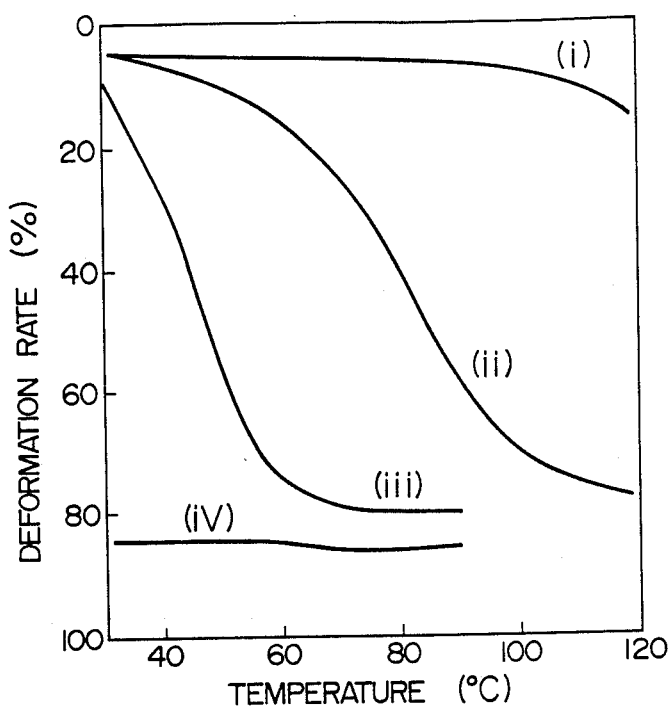
FIG. 3 is a graph showing deformation rates of various light-curable resin compositions at various temperatures.

Change of deformation rate of each sample at each temperature was measured and shown in FIG. 3, wherein the curve (i) is the plates obtained from the resin compositions of Examples 1 and 5, the curve (ii) is the plate obtained from the resin composition of Comparative Example 5, the curve (iii) is the plate obtained from the resin composition of Comparative Example 2, and the curve (iv) is the plate obtained from the resin composition of Comparative Example 1.

$$\text{Deformation rate (\%)} = \frac{\text{Vertical distance between the fixed end and the loaded end}}{\text{Length of a sample}} \times 100$$

Further, the optical discs obtained in Example 14 by using the resin compositions of Examples 1 and 5, and Comparative Examples 1, 2 and 5 were also placed in the constant temperature bath and subjected to the temperature rise with an internal of 10° C. to measure the temperature of generating cracks on recording films. The optical discs obtained by using the resin compositions of Examples 1 and 5 produced no cracks even at 120° C. On the other hand, cracks were generated at 30° C. in the case of the optical disc obtained by using the resin composition of Comparative Example 1, at 40° C. in the case of that obtained by using the resin composition of Comparative Example 2, and at 70° C. in the case of that obtained by using the resin composition of Comparative Example 5.

EXAMPLES 16 TO 39

Light-curable resin compositions were prepared by using the compounds [I], [II], and [IV] and the photopolymerization initiator as listed in Table 4.

Using these resin compositions, transparent substrates were produced in the same manner as described in Example 14 except for using a nickel-made stamper having an outer diameter of 300 mm, and a transparent support having an outer diameter of 300 mm and changing the intensity of energy beams from 30 mw/cm$^2$ to 150 mw/cm$^2$ and the irradiation time from 90 seconds to 40 seconds.

The thus produced transparent substrates with grooves and pits were subjected to the following tests.

(1) Workability

When the viscosity of a liquid light-curable resin composition was too high at the time of pouring the resin composition into the space 6 formed by the stamper 1 and the transparent glass support 2, it was difficult to pour the resin composition into the space and the workability was lowered remarkably. Since working became remarkably difficult when the viscosity at 25° C. was higher than 200 poises, such a viscosity was regarded as standard for judging the workability.

(2) Curing Properties

Curing state of a transparent substrate formed was judged from a surface appearance.

(3) Retardation

Retardation of a single pass at a wavelength of 830 nm [$R = d(n_1 - n_2)$, wherein d is the thickness of a transparent support; and $n_1$ and $n_2$ are refractive indexes at main stress directions 1 and 2].

(4) Heat Resistance

A flat plate of 45 mm long and 5 mm wide was cut from a transparent support. One end of the flat plate at the lengthwise direction was fixed and the other end was loaded with a load of 10 g, while the temperature was raised at a rate of 10° C./min to measure the temperature beginning deformation.

(5) Tensile Strength

A dumbbell specimen was cut from a transparent substrate obtained and measured according to JIS-K6745.

The test results are shown in Table 4.

Desirable transparent substrates with grooves and pits are good in curing properties, have the retardation of 10 nm or less, the heat resistance of 70° C. or higher, and the tensile strength of 500 kg/cm$^2$ or more. Further, in the case of using for erasable magneto-optical discs, it is necessary to make the retardation particularly 5 nm or less, since the information signals are readily influenced by optical strain of the base plate (or substrate). If the above-mentioned requirements are not satisfied, various disadvantages occur such as an increase of signal noises for optical disc recording mediums, warpage under a high temperature atmosphere, and destruction during the operation.

In Table 4, Examples 20 to 24, 26 and 27 are Comparative Examples wherein the compound of the formula [I] is not used or used in too small an amount. In Examples 16 to 19 and 25, the compound of the formula [I] is used, but the compounds of the formula [II] and/or [IV] are not used, as that the test results are not so satisfactory as those of Examples 28 to 39.

TABLE 4

| | Compound | Example 16 | 17 | 18 | 19 | 20 | 21 | 22 | 23 | 24 | 25 | 26 | 27 | 28 |
|---|---|---|---|---|---|---|---|---|---|---|---|---|---|---|
| Compound [I] | (dicyclopentadiene diacrylate: CH$_2$=CHCO-O-CH$_2$— / —CH$_2$-OCCH=CH$_2$) | 100 | 80 | 60 | 30 | 0 | 0 | 0 | 0 | 0 | 50 | 10 | 10 | 75 |
| Compound [IV] | $[CH_2=C(CH_3)-C(O)-O-CH_2-C(C_2H_5)(H)-CH_2-OCN(H)-C(O)-CH_2-$ cyclohexane(CH$_3$)$_3$-NCO$]_2$-(CH$_2$)$_{10}$ | 0 | 20 | 40 | 70 | 100 | 70 | 40 | 20 | 0 | 0 | 85 | 20 | 20 |
| Compound [III] | Isobornyl methacrylate | 0 | 0 | 0 | 0 | 0 | 30 | 60 | 80 | 100 | 50 | 5 | 70 | 5 |
| Photo-polymerization initiator | 2-Hydroxy-2-methyl-1-phenylpropane-1-one | 2 | 2 | 2 | 2 | 2 | 2 | 2 | 2 | 2 | 2 | 2 | 2 | 2 |
| Properties | Workability | G | G | P | P | P | G | G | G | G | G | G | P | G |
| | Curing properties | G | G | G | G | G | G | G | I | I | G | G | G | G |
| | Retardation (nm) (830 nm, 1 mm thick) | 10 | 7 | 6 | 5 | 3 | 2 | — | — | — | 2 | 3 | I | 3 |
| | Heat resistance (°C) | 120 | 120 | 100 | 60 | 50 | 45 | — | — | — | 100 | 70 | — | 115 |
| | Tensile strength (kg/cm²) | 200 | 250 | 300 | 550 | 800 | 600 | — | — | — | 100 | 700 | — | 520 |

| | Example 29 | 30 | 31 | 32 | 33 | 34 | 35 | 36 | 37 | 38 | 39 |
|---|---|---|---|---|---|---|---|---|---|---|---|
| Compound [I] (CH$_2$=CHCO-O-CH$_2$— / —CH$_2$-OCCH=CH$_2$) | 55 | 25 | 10 | 10 | 30 | 60 | 40 | 30 | 30 | 30 | 20 |

TABLE 4-continued

| Compound [IV] | | | | | | | | | | |
|---|---|---|---|---|---|---|---|---|---|---|
| structure: CH$_2$=C(CH$_3$)—C(=O)—O—CH$_2$—CH(C$_2$H$_5$)—OCN(H)—[cyclohexane with CH$_3$, CH$_3$, CH$_3$ substituents]—CH$_2$—NCO—(=O)—(CH$_2$)$_{10}$ | 40 | 70 | 70 | 40 | 20 | 40 | 60 | 50 | 30 | 40 |
| Compound [II] Isobornyl methacrylate | 5 | 5 | 20 | 50 | 20 | 10 | 20 | 40 | 40 | |
| Photopolymerization initiator: 2-Hydroxy-2-methyl-1-phenylpropane-1-one | 2 | 2 | 2 | 2 | 2 | 2 | 2 | 2 | 2 | 2 |
| Properties | | | | | | | | | | |
| Workability | G | G | G | G | G | G | G | G | G | G |
| Curing properties | G | G | G | G | G | G | G | G | G | G |
| Retardation (nm) (830 nm, 1 mm thick) | 3 | 2 | 2 | 1 | 2 | 2 | 2 | 2 | 1 | 1 |
| Heat resistance (°C.) | 110 | 75 | 75 | 80 | 90 | 115 | 110 | 100 | 80 | 90 |
| Tensile strength (kg/cm$^2$) | 600 | 550 | 600 | 550 | 560 | 510 | 700 | 600 | 550 | 600 |

Note
G: Good
P: Poor
I: Insufficient

EXAMPLES 40 TO 45, COMPARATIVE EXAMPLES 6 AND 7

Light-curable resin compositions were prepared by mixing the compounds in amounts as listed in Table 5. Using these resin compositions, transparent substrates with grooves and pits were produced and evaluated in the same manner as described in Examples 16 to 39.

The result are shown in Table 5.

As is clear from Table 5, the transparent substrates of Comparative Examples 6 and 7 are poor in retardation, heat resistance and tensile strength, while those of Examples 40 to 45 are satisfactory in all properties.

Further, the substrates of Examples 28 to 45 had the light transmittance of 95% or more when measured by using a light of 830 nm.

TABLE 5

| | Comparative Example | | Example | | | | | |
|---|---|---|---|---|---|---|---|---|
| | 6 | 7 | 40 | 41 | 42 | 43 | 44 | 45 |
| Generally used acrylate and methacrylate $\left\{ CH_2=CHC-O-CH_2-CH_2-O- \right\}_2 \bigotimes_{CH_3}^{CH_3} \bigotimes$ | 100 | | | | | | | |
| $CH_2=CHC-O-CH_2 \overset{CH_3}{\underset{CH_3}{C}} \overset{CH_2-CH_3}{\underset{O-CH_2}{C}} \overset{CH_2-O-C-CH=CH_2}{\underset{CH_2-O-C-CH=CH_2}{}}$ | | 100 | | | | | | |
| Compound [I] (tricyclodecane diacrylate structure) | | | 40 | 40 | 40 | 40 | 35 | 40 |
| Compound [I] (pentacyclic diacrylate structure) | | | | | | | | |
| Compound [IV] (bis(cyclohexyl)methane diurethane diacrylate) | | | 40 | | 40 | 40 | | 40 |
| Compound [IV] (methylcyclohexyl urethane structure) | | | | 40 | | | | |

TABLE 5-continued

| | Comparative Example | | Example | | | | | | |
|---|---|---|---|---|---|---|---|---|---|
| | 6 | 7 | 40 | 41 | 42 | 43 | 44 | 45 |
| (CH₂=CHCO-CH₂-$\overset{\displaystyle C_2H_5}{\underset{\displaystyle |}{C}}$-CH₂-O-$\overset{\displaystyle O}{\underset{\displaystyle \|}{C}}$-$\overset{\displaystyle H}{\underset{\displaystyle |}{N}}$-⟨cyclohexyl⟩-$\overset{\displaystyle H}{\underset{\displaystyle |}{C}}$-⟨cyclohexyl⟩-$\overset{\displaystyle H}{\underset{\displaystyle |}{N}}$-$\overset{\displaystyle O}{\underset{\displaystyle \|}{C}}$-O)₂-(CH₂)₁₀- | | | | | 35 | 40 | 40 | |
| $\left(\text{CH}_2=\overset{\displaystyle CH_3}{\underset{\displaystyle |}{C}}-\overset{\displaystyle O}{\underset{\displaystyle \|}{C}}-O-CH_2-\text{(trimethylcyclohexyl with CH}_2\text{-N-C-O-)}\right)_2$-(CH₂)₁₂- | | | | | | | | 20 |
| Bornyl methacrylate CH₂=C(CH₃)-C(=O)-O-bornyl | | | | 20 | 25 | | 25 | |
| Tricyclodecanyl acrylate CH₂=CH-C(=O)-O-tricyclodecanyl | | | 20 | | | | | |
| Compound [II] | | | | | | | | |
| Photopolymerization initiator 1-Hydroxycyclohexyl phenyl ketone | 2 | 2 | 2 | 2 | 2 | 2 | 2 | 2 |
| Properties | | | | | | | | |
| Workability | G | G | G | G | G | G | G | G |
| Curing properties | G | G | G | G | G | G | G | G |
| Retardation (nm) (830 nm, 1 mm thick) | 20 | 70 | 2 | 2 | 2 | 2 | 2 | 2 |
| Heat resistance (°C.) | 50 | 80 | 125 | 125 | 122 | 120 | 120 | 124 |
| Tensile strength (kg/cm²) | 470 | 220 | 600 | 630 | 650 | 700 | 700 | 600 |

(Note)
G: Good

EXAMPLE 46

On each transparent substrate having grooves and pits thereon obtained in Examples 28 to 39 an enhance film made of SiO with 100 nm thick, a Te-Fe alloy magnetic film with 100 nm thick, and a SiO protective film were vapor deposited in this order. Further, a polycarbonate plate of 1 mm thick was bonded to the SiO protective film by using an epoxy resin adhesive to form a magneto-optical disc recording medium. Writing and erasing of information were conducted from the transparent substrate side by using a semiconductor laser light of 830 nm and a magnet. The state of the writing and erasing were measured by using a semiconductor laser light to determine that these magneto-optical disc operated normally.

According to this invention, there can be produced optical discs with high productivity and low production cost due to the use of the base plates for optical discs having little optical strain, high heat resistance, excellent mechanical strength and precision and high transparency.

What is claimed is:

1. In an optical disc comprising a transparent base plate having a relief structure corresponding to information signals to be carried and a recording film layer formed thereon, the improvement wherein the transparent base plate is made from a light-curable resin composition comprising:
    100 parts by weight of a first component made of at least one acrylic group- or methacrylic group-containing compound, said first component comprising a compound of the formula:

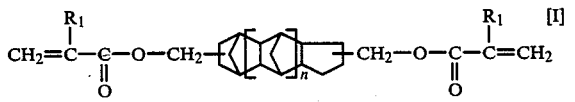

wherein $R_1$ is hydrogen or a methyl group, and n is an integer of 2 to 5, in an amount of 30 to 100% by weight of said first component; and
    0.5 to 10 parts by weight of a photopolymerization initiator as a second component.

2. An optical disc according to claim 1, wherein the transparent base plate comprises a transparent support and a transparent undercoating layer made from said light-curable resin composition.

3. An optical disc according to claim 2, wherein said first component further comprises a monofunctional acrylic group- or methacrylic group-containing compound, and a polyfunctional acrylic group- or methacrylic group-containing compound.

4. An optical disc according to claim 1, wherein said first component further comprises at least one acrylic group- or methacrylic group-containing compound selected from the group consisting of monofunctional monomers and polyfunctional monomers.

5. An optical disc according to claim 1, wherein said first component further comprises a monofunctional acrylic group- or methacrylic group-containing compound, and a polyfunctional acrylic group- or methacrylic group-containing compound.

6. In an optical disc comprising a transparent base plate having a relief structure corresponding to information signals to be carried and a recording film layer formed thereon, the improvement wherein the transparent base plate is made from a light-curable resin composition comprising:
    100 parts by weight of a first component made of at least one acrylic group- or methacrylic group-containing compound, said first component comprising a compound of the formula:

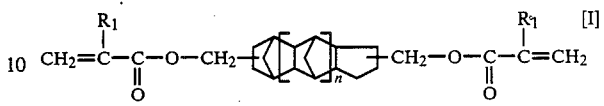

wherein $R_1$ is hydrogen or a methyl group, and n is zero or an integer of 1 to 5, in an amount of 10 to 75% by weight of said first component, and
    a polyfunctional monomer represented by the formula:

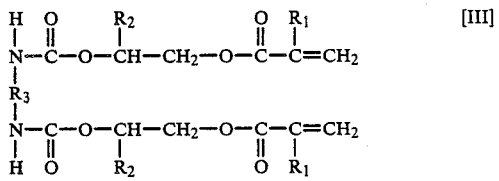

wherein $R_1$ is hydrogen or a methyl group, $R_2$ is hydrogen, an alkyl group having 1 to 5 carbon atoms, or

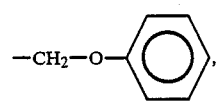

and $R_3$ is a hydrocarbon group having 6 to 16 carbon atoms; and
    0.5 to 10 parts by weight of a photopolymerization initiator as a second component.

7. An optical disc according to claim 6, wherein said polyfunctional monomer represented by the formula [III] is contained in an amount of 20 to 70% by weight of said first component.

8. An optical disc according to claim 6, wherein n in the formula [I] is an integer of 2 to 5.

9. An optical disc according to claim 6, wherein the transparent base plate comprises a transparent support and a transparent undercoating layer made from said light-curable resin composition.

10. In an optical disc transparent base plate having a relief structure corresponding to information signals to be carried and a recording film layer formed thereon, the improvement wherein the transparent base plate is made from a light-curable resin composition comprising:
    100 parts by weight of a first component made of at least one acrylic group- or methacrylic group-containing compound, said first component comprising a compound of the formula:

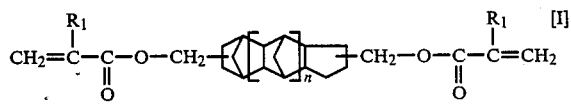

wherein $R_1$ is hydrogen or a methyl group, and n is zero or an integer of 1 to 5, in an amount of 10 to 75% by weight of said first component, a monofunctional acrylic group- or methacrylic group-containing compound represented by the formula:

$$CH_2=\underset{R_1}{\underset{|}{C}}-\underset{O}{\underset{\|}{C}}-O-R_5 \qquad [II]$$

wherein $R_1$ is hydrogen or a methyl group, and $R_5$ is a hydrocarbon group having 6 to 16 carbon atoms in an amount of 5 to 50% by weight of said first component, and a polyfunctional acrylic group- or methacrylic group-containing compound is represented by the formula:

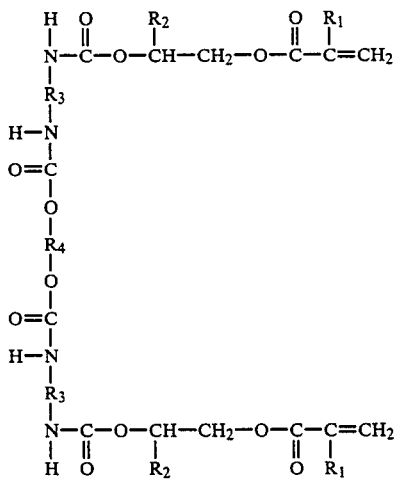

[IV]

wherein $R_1$ is hydrogen or a methyl group, $R_2$ is an alkyl group having 1 to 5 carbon atoms or

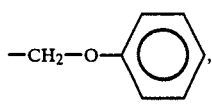

$R_3$ is a hydrocarbon group having 6 to 16 carbon atoms, and $R_4$ is a hydrocarbon group having 2 to 100 carbon atoms in an amount of 20 to 70% by weight of said first component; and 0.5 to 10 parts by weight of a photopolymerization initiator as a second component.

11. An optical disc according to claim 2, wherein said first component further comprises at least one acrylic group- or methacrylic group-containing compound selected from the group consisting of monofunctional monomers and polyfunctional monomers.

12. An optical disc according to claim 11, wherein the monofunctional monomer is represented by the formula:

$$CH_2=\underset{R_1}{\underset{|}{C}}-\underset{O}{\underset{\|}{C}}-O-R_5 \qquad [II]$$

wherein $R_1$ is hydrogen or a methyl group; and $R_5$ is a hydrocarbon group having 6 to 16 carbon atoms.

13. An optical disc according to claim 10, wherein the compound of the formula [I], the compound of the formula [II] and the compound of the formula [IV] are contained in amounts enclosed by the line A-B-C-D-E-A in the triangular diagram of FIG. 4 wherein the points A, B, C, D and E have the following values in percents by weight:

| Point | Compound [I] | Compound [IV] | Compound [II] |
|-------|--------------|---------------|---------------|
| A | 75 | 20 | 5 |
| B | 25 | 70 | 5 |
| C | 10 | 70 | 20 |
| D | 10 | 40 | 50 |
| E | 30 | 20 | 50 |

14. An optical disc according to claim 10, wherein n in the formula [I] is an integer of 2 to 5.

15. An optical disc according to claim 10, wherein the transparent base plate comprises a transparent support and a transparent undercoating layer made from said light-curable resin composition.

16. An optical disc according to claim 15, wherein the compound of the formula [I], the compound of the formula [II] and the compound of the formula [IV] are contained in amounts enclosed by the line A-B-C-D-E-A in the triangular diagram of FIG. 4 wherein the points A, B, C, D and E have the following values in percents by weight:

| Point | Compound [I] | Compound [IV] | Compound [II] |
|-------|--------------|---------------|---------------|
| A | 75 | 20 | 5 |
| B | 25 | 70 | 5 |
| C | 10 | 70 | 20 |
| D | 10 | 40 | 50 |
| E | 30 | 20 | 50 |

17. An optical disc according to claim 16, wherein n in the formula [I] is zero or an integer of 1.

18. In an optical disc comprising a transparent base plate having a relief structure corresponding to information signals to be carried and a recording film layer formed thereon, the improvement wherein the transparent base plate is made from a light-curable resin composition comprising:

100 parts by weight of a first component made of at least one acrylic group- or methacrylic group-containing compound, said first component comprising a compound of the formula:

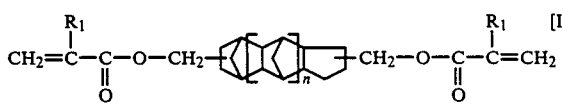

[I]

wherein $R_1$ is hydrogen or a methyl group, and n is zero or an integer of 1 to 5, in an amount of 10 to 75% by weight of said first component, and a polyfunctional acrylic group- or methacrylic group-containing compound represented by the formula:

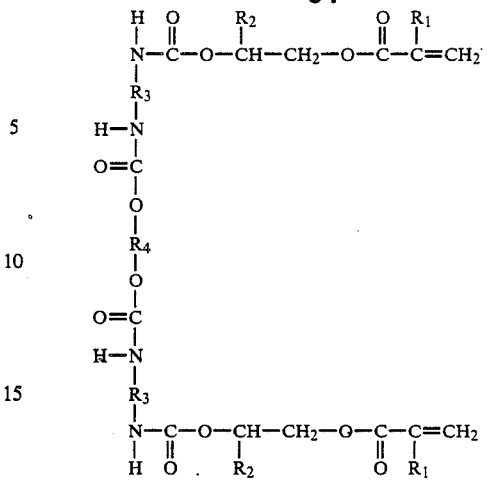

wherein $R_1$ is hydrogen or a methyl group, $R_2$ is an alkyl group having 1 to 5 carbon atoms or

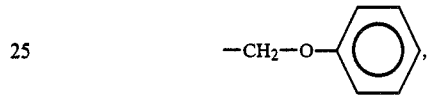

$R_3$ is a hydrocarbon group having 6 to 16 carbon atoms, and $R_4$ is a hydrocarbon group having 2 to 100 carbon atoms in an amount of 20 to 70% by weight of said first component; and 0.5 to 10 parts by weight of a photopolymerization initiator as a second component.

19. An optical disc according to claim 18, wherein the transparent base plate comprises a transparent support and a transparent undercoating layer made from said light-curable resin composition.

* * * * *